(12) United States Patent
Pedicni

(10) Patent No.: US 6,235,418 B1
(45) Date of Patent: May 22, 2001

(54) UNIFORM SHELL FOR A METAL-AIR BATTERY STACK

(75) Inventor: Christopher S. Pedicni, Roswell, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/216,114

(22) Filed: Dec. 18, 1998

(51) Int. Cl.[7] .............................. H01M 12/06; H01M 8/04
(52) U.S. Cl. ................................................. 429/27; 429/34
(58) Field of Search ............................. 429/27, 34

(56) References Cited

U.S. PATENT DOCUMENTS

| | | | |
|---|---|---|---|
| 3,897,267 | 7/1975 | Tseung et al. | 136/86 |
| 3,915,749 | 10/1975 | Weidlich | 136/86 A |
| 4,064,323 | 12/1977 | Messing | 429/86 |
| 4,189,526 | 2/1980 | Cretzmeyer et al. | 429/13 |
| 4,369,235 | 1/1983 | Bursell | 429/27 |
| 4,913,983 | 4/1990 | Cheiky | 429/13 |
| 5,306,578 | 4/1994 | Ohashi et al. | 429/27 |
| 5,362,577 | * 11/1994 | Pedicini . | |
| 5,415,949 | 5/1995 | Stone et al. | 429/63 |
| 5,571,630 | * 11/1996 | Cheiky | 429/27 X |
| 5,691,074 | 11/1997 | Pedicini | 429/27 |
| 5,707,757 | 1/1998 | Lee | 429/86 |
| 5,919,582 | * 7/1999 | Pedicini et al. | 429/27 X |
| 6,068,944 | * 5/2000 | Witzigreuter | 429/27 |

FOREIGN PATENT DOCUMENTS

| | | |
|---|---|---|
| 2051235 | 10/1970 | (DE) . |
| 48-26896 | 8/1973 | (JP) . |
| 58-218774 | 12/1983 | (JP) . |
| 59-214171 | 12/1984 | (JP) . |
| WO 97/15090 | 4/1997 | (WO) . |

OTHER PUBLICATIONS

Whyte, L., "Super Batteries Open New Fields", *The New Zealand Electricl Journal*, vol. 44, No. 12, pp. 236–237, (Dec. 1971).

* cited by examiner

Primary Examiner—John S. Maples
(74) Attorney, Agent, or Firm—Alston & Bird LLP

(57) ABSTRACT

An improved metal-air battery having a metal-air cell stack positioned within a substantially uniform shell. The metal-air cell stack includes an isolating passageway and a substantially oxygen-permeable, water impermeable shell.

30 Claims, 4 Drawing Sheets

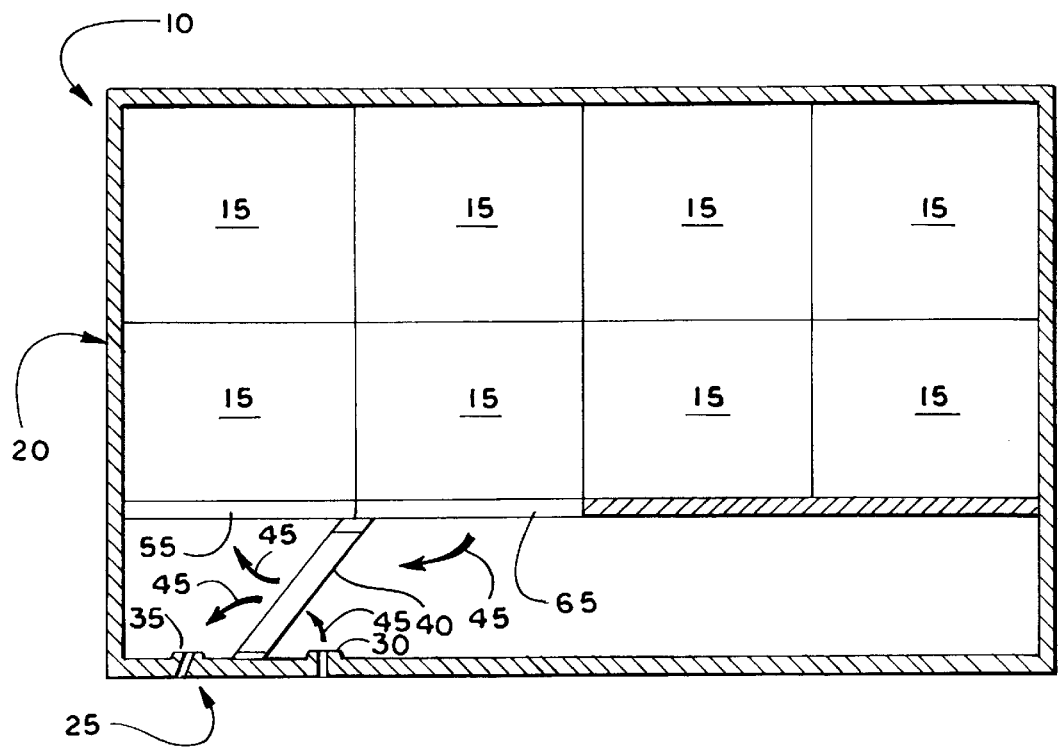
Fig_1 PRIOR ART
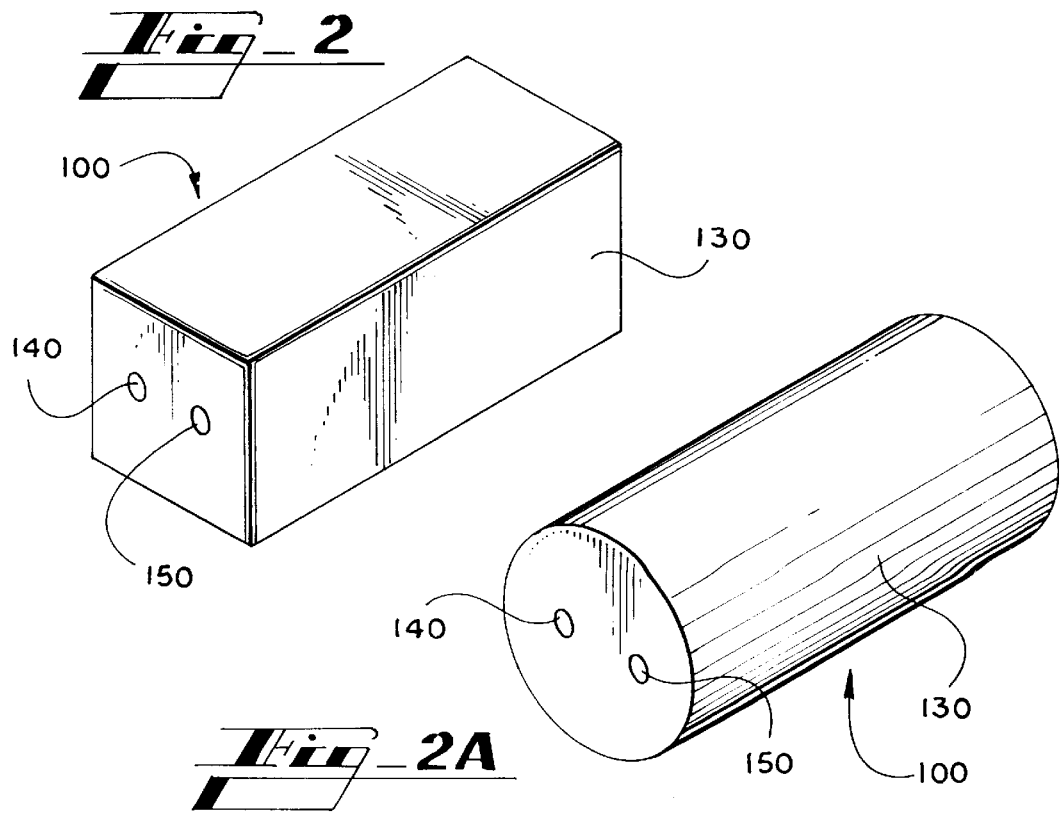
Fig_2
Fig_2A

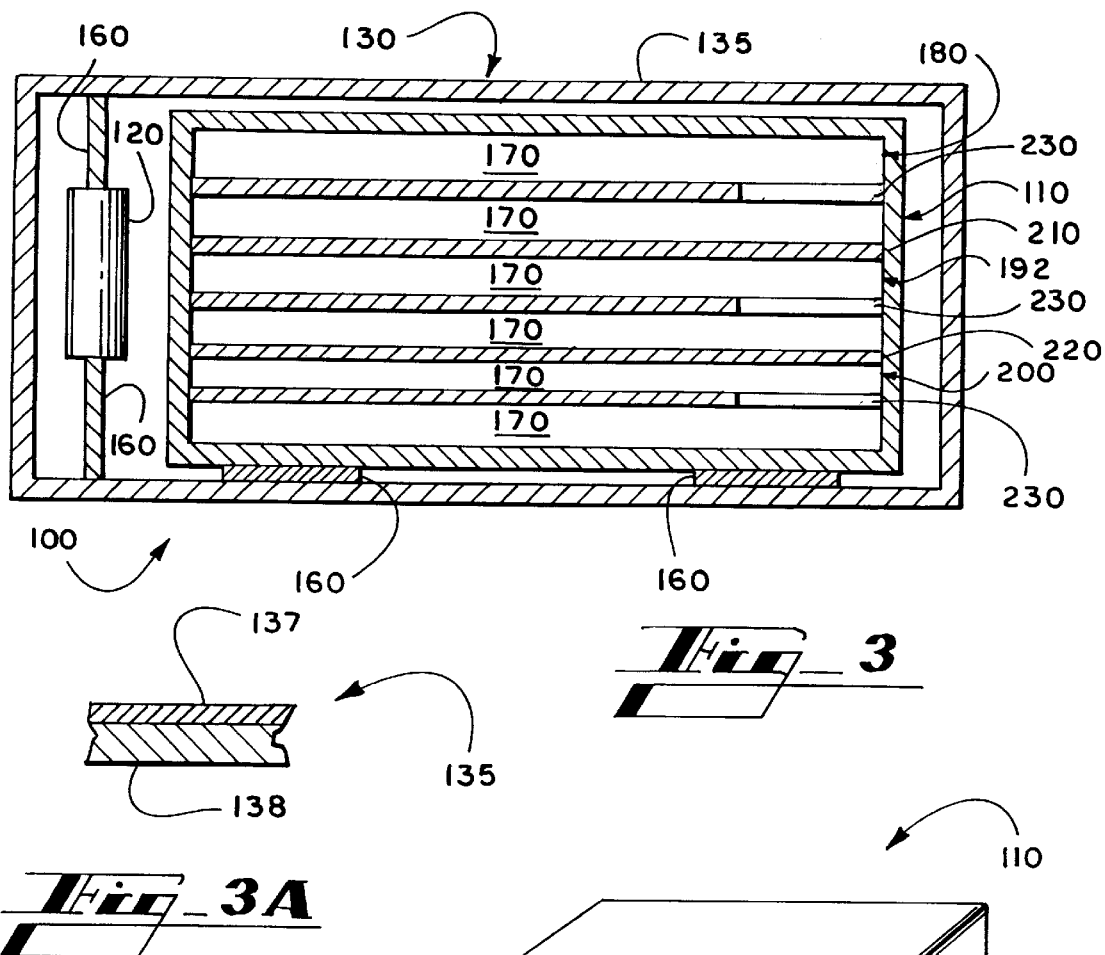
Fig_3
Fig_3A
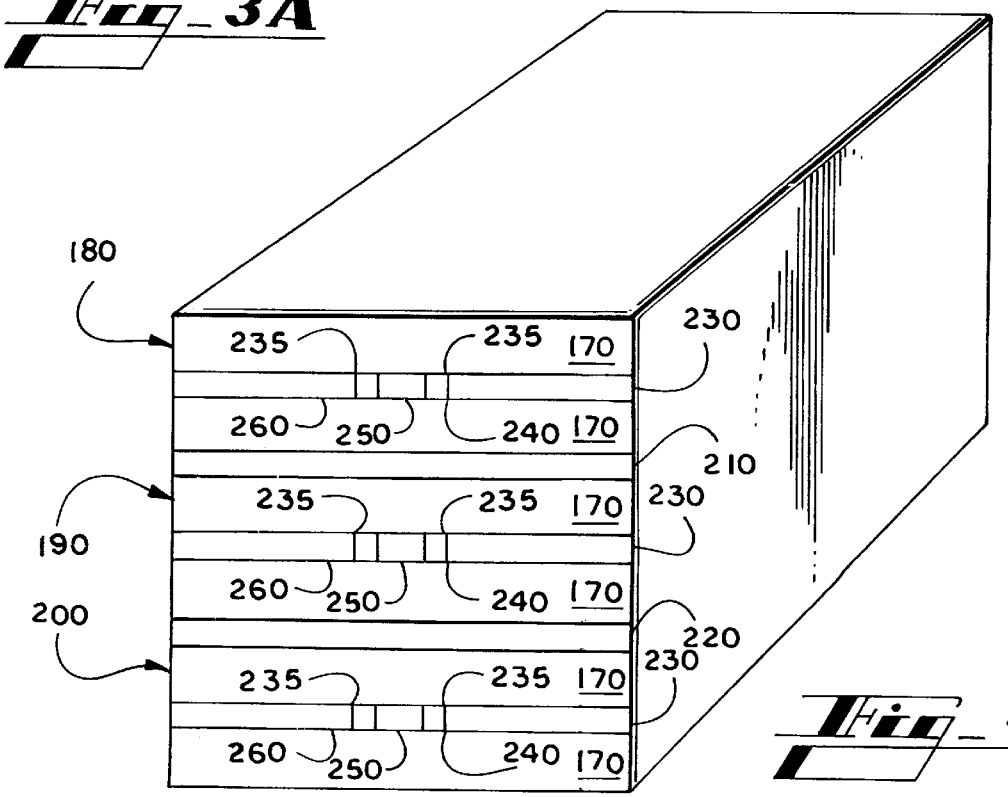
Fig_4

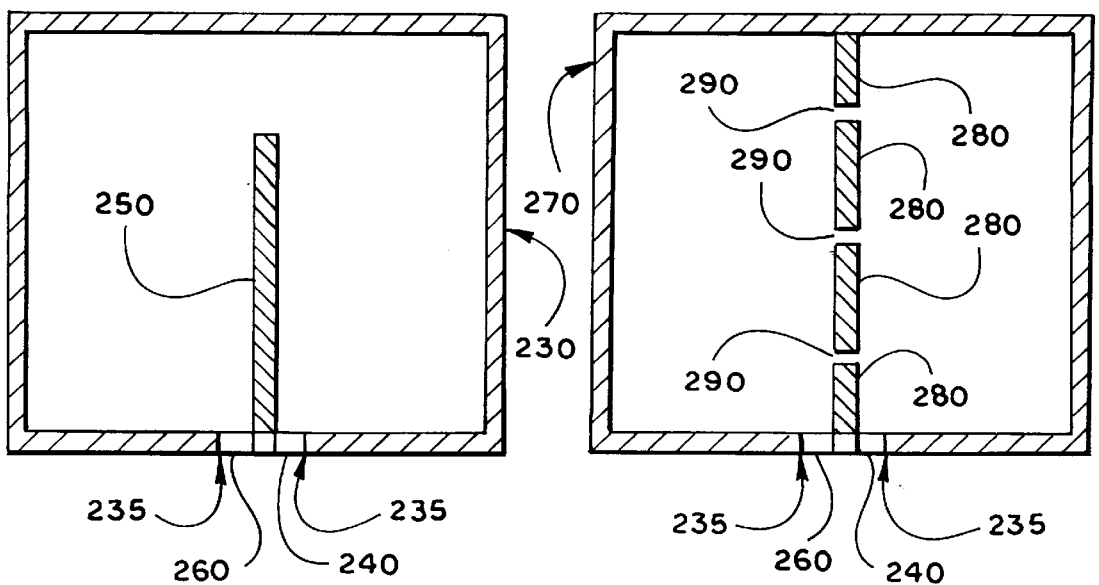
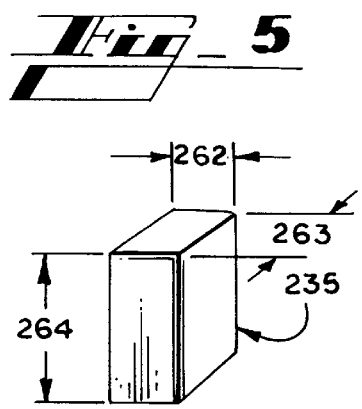
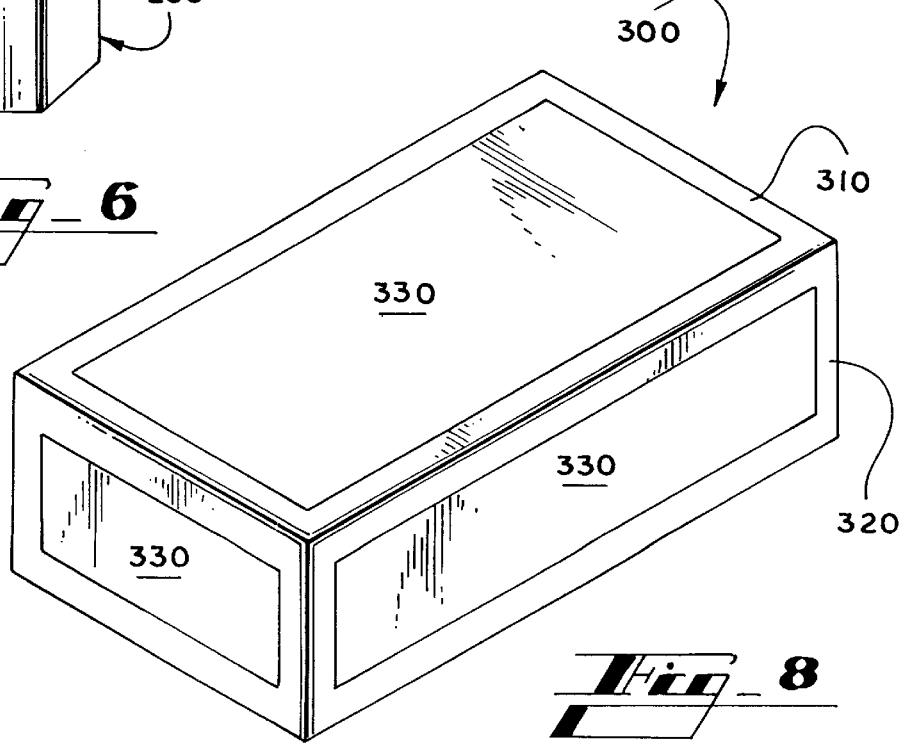

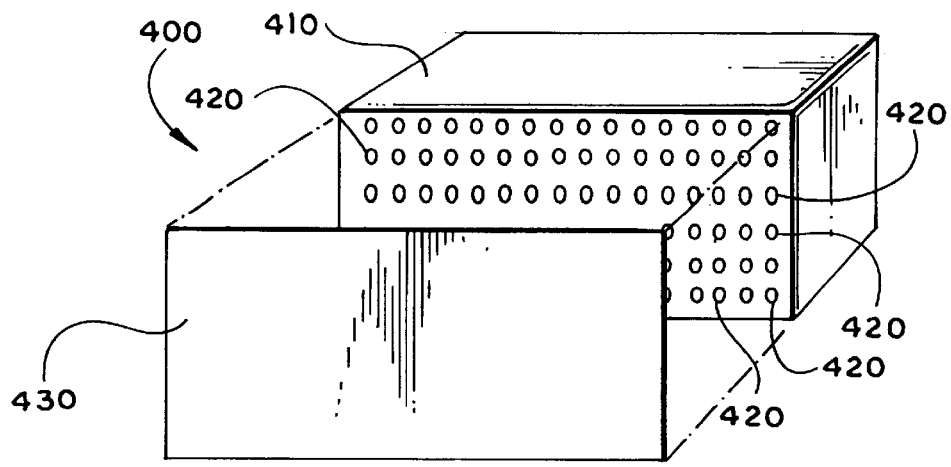
Fig_9
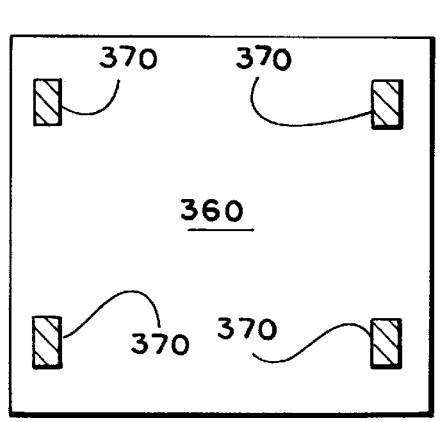
Fig_11
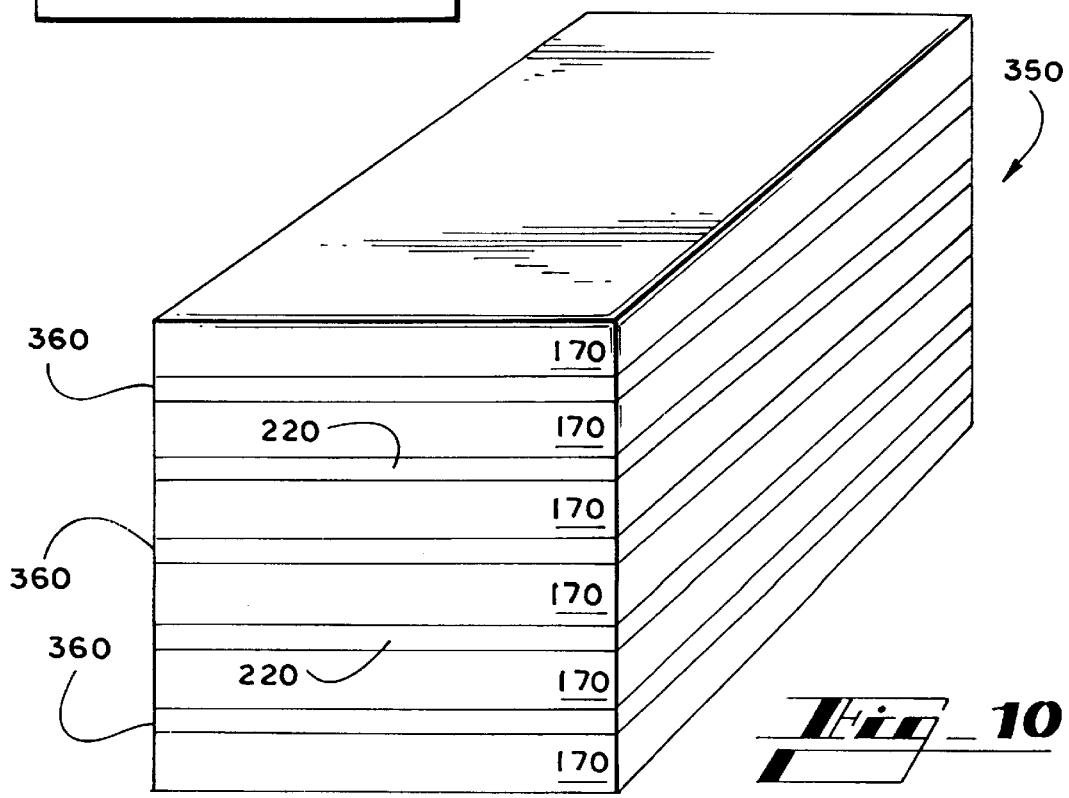
Fig_10

UNIFORM SHELL FOR A METAL-AIR BATTERY STACK

RELATED APPLICATIONS

The following patent applications for related subject matter:

"CYLINDRICAL METAL-AIR BATTERY WITH A CYLINDRICAL PERIPHERAL AIR CATHODE";

"AIR MANAGER SYSTEMS FOR METAL-AIR BATTERIES UTILIZING A DIAPHRAGM OR BELLOWS";

"AIR MOVER FOR A METAL-AIR BATTERY UTILIZING A VARIABLE VOLUME ENCLOSURE";

"DIFFUSION CONTROLLED AIR VENT WITH AN INTERIOR FAN";

"LOAD RESPONSIVE AIR DOOR FOR A METAL-AIR CELL";

"GEOMETRY CHANGE DIFFUSION TUBE FOR METAL-AIR BATTERIES";

"AIR-MANAGING SYSTEM FOR METAL-AIR BATTERY USING RESEALABLE SEPTUM"; and

"AIR DELIVERY SYSTEM WITH VOLUME-CHANGEABLE PLENUM OF METAL-AIR BATTERY";

all of which are incorporated herein by reference, have been filed concurrently with the present application by the assignee of the present application.

TECHNICAL FIELD

The present invention relates generally to metal-air power supplies and more particularly relates to a metal-air battery having a cell stack positioned within a uniform outer shell.

BACKGROUND OF THE INVENTION

Generally described, a metal-air cell includes one or more oxygen electrodes separated from a metallic anode by an aqueous electrolyte. A metal-air cell also can include one or more oxygen electrodes that cooperate with suspended metallic anode particles in a paste-like electrolyte. During operation of a metal-air cell, such as a zinc-air cell, oxygen from the ambient air and water from the electrolyte are converted at the oxygen electrode to form hydroxide ions. The zinc is then oxidized at the anode and reacts with the hydroxide ions such that water and electrons are released to provide electrical energy.

Metal-air cells have been recognized as a desirable means for powering portable electronic equipment, such as personal computers, camcorders, and telephones. As compared to conventional electrochemical power sources, metal-air cells provide relatively high power output and long lifetime with relatively low weight. These advantages are due in part to the fact that the metal-air cells utilize oxygen from the ambient air as the reactant in the electrochemical process as opposed to a heavier material such as a metal or a metallic composition.

Air managers have been developed that provide the metal-air cells with a flow of reactive air so as to support high power output while also isolating the cells from the ambient air and changes in humidity, particularly when no power output is required. For example, a mechanical air door system is shown in U.S. Pat. No. 4,913,983 to Chieky. This reference describes a fan used to supply a flow of ambient air to a pack of metal-air cells within the battery housing. When the battery pack is turned on, the mechanical air doors adjacent to an air inlet and an air outlet are opened and the fan is activated to create the flow of air into, through, and out of the housing. The air doors are then closed when the battery is turned off to isolate the cells from the environment. Although the mechanical air doors may limit the transfer of oxygen, water vapor, and contaminates into and out of the housing when the fan is off, such mechanical air doors add complexity to the battery housing itself and, inevitably, increase the size and cost of the overall battery pack.

A vast improvement in air manager technology is found in commonly owned U.S. Pat. No. 5,691,074 to Pedicini, entitled "Diffusion Controlled Air Vent for a Metal-Air Battery". Pedicini discloses, in one embodiment, a group of metal-air cells isolated from the ambient air except for an inlet and an outlet passageway. These passageways may be, for example, in the form of elongate tubes. An air-moving device, such as a fan, may be positioned within the housing to force air through the inlet and outlet passageways so as to circulate and to refresh the air across the oxygen electrodes. The passageways are sized to allow sufficient airflow therethrough while the air mover is operating but also to restrict the passage of water vapor therethrough while the passageways are unsealed and the air mover is not operating.

When the air mover is off and the humidity level within the cell is relatively constant, only a very limited amount of oxygen diffuses through the passageways. The water vapor within the cell largely protects the oxygen electrodes from exposure to oxygen. The oxygen electrodes are sufficiently isolated from the ambient air by the water vapor such that the cells have a long "shelf life" without sealing the passageways with a mechanical air door. These passageways may be referred to as "diffusion tubes", "isolating passageways", or "diffusion limiting passageways" due to their isolating capabilities.

Specifically, FIG. 1 herein shows one embodiment of the metal-air battery disclosed in Pedicini. The metal-air battery 10 includes a plurality of cells 15 enclosed within a housing 20. The housing 20 isolates the cells 15 from the ambient air with the exception of a plurality of ventilation openings 25. A single air inlet opening 30 and a single air outer opening 35 are utilized herein. A circulating fan 40 is provided for convective airflow both into and out of the housing 20 and to circulate and mix the gases within the housing 20. The arrows 45 shown in FIG. 1 represent a typical circulation of the gases into, out of, and within the housing 20 to provide the reactant air to the cells 15. The fan 40 forces the air through the air inlet 30, into an air plenum inlet 55, across the cells 15, out of an air plenum outlet 65, and then either to recirculate within the housing 20 or to pass out of the air outlet 35. U.S. Pat. No. 5,691,074 is incorporated herein by reference.

The isolating passageways act to minimize the detrimental impact of humidity on the metal-air cells, especially while the air-moving device is off. A metal-air cell that is exposed to ambient air having a high humidity level may absorb too much water through its oxygen electrode and fail due to a condition referred to as "flooding." Alternatively, a metal-air cell that is exposed to ambient air having a low humidity level may release too much water vapor from its electrolyte through the oxygen electrode and fail due to a condition referred to as "drying out." The isolating passageways limit the transfer of moisture into or out of the metal-air cells while the air mover is off, so that the negative impacts of the ambient humidity level are minimized.

The efficiency of the isolating passageways in terms of the transfer of air and water into and out of a metal-air cell can be described in terms of an "isolation ratio." The "isolation ratio" is the rate of the water loss or gain by the cell while its oxygen electrodes are fully exposed to the ambient air as compared to the rate of water loss or gain by a cell while its oxygen electrodes are isolated from the ambient air except through one or more limited openings. For example, given identical metal-air cells having electrolyte solutions of approximately thirty-five percent (35%) KOH in water, an internal relative humidity of approximately fifty percent (50%), ambient air having a relative humidity of approximately ten percent (10%), and no fan-forced circulation, the water loss from a cell having an oxygen electrode fully exposed to the ambient air should be more than one hundred (100) times greater than the water loss from a cell having an oxygen electrode that is isolated from the ambient air except through one or more isolating passageways of the type described above. In this example, an isolation ratio of more than about one hundred (100) to one (1) may be obtained.

In accordance with the above-referenced example from Pedicini, the isolating passageways also function to limit the amount of oxygen that can reach the oxygen electrodes when the fan is off and the internal humidity level is relatively constant. This isolation minimizes the self-discharge and leakage or drain current of the metal-air cells. Self-discharge can be characterized as a chemical reaction within a metal-air cell that does not provide a usable electric current. Self-discharge diminishes the capacity of the metal-air cell for providing a usable electric current. Self-discharge occurs, for example, when a metal-air cell dries out and the zinc anode is oxidized by the oxygen that seeps into the cell during periods of non-use. Leakage current, which is synonymous with drain current, can be characterized as the electric current that can be supplied to a closed circuit by a metal-air cell when oxygen is not provided to the cell by an air mover. The isolating passageways as described above may limit the total drain current to an amount smaller than the output current by a factor of at least about fifty (50) times.

Although the isolating passageways described above are effective in providing oxygen to the cells during periods of use and also in isolating the cells during the periods of non-use, the effectiveness of the battery as a whole may be compromised if the passageways are somehow obstructed. For example, the isolating passageways may be blocked if water, sand, dust, or other materials inadvertently fill or cover the passageways. Further, the passageways also may be blocked if the battery is placed against a non-air permeable surface. Once the isolating passageways are blocked, the cells will be inoperative due to a lack of oxygen. Further, the user may not even know if the passageways are clogged or how to remedy the problem.

There is a need, therefore, for a metal-air cell and/or battery pack that maintains the advantages of the isolating passageways while also ensuring an adequate air flow path. These advantages must be accomplished in a metal-air cell or battery pack that provides the traditional power and lifetime capabilities of a metal-air cell in a low cost, efficient manner.

SUMMARY OF THE INVENTION

The present invention is directed towards an improved metal-air battery. Advantageously, the metal-air battery provides for a metal-air cell stack with an isolating passageway positioned within a substantially uniform shell. The substantially uniform shell protects the cell stack from water, dust, and other materials while the isolating passageways protect the metal-air cells from the ambient air while the battery is not operating. The present invention thus provides an improved metal-air cell with a high isolation ratio but without the possibility of a blocked or clogged diffusion pathway.

One embodiment of the present invention includes an air mover positioned adjacent to the cell stack and within the uniform shell. The shell may be a substantially air permeable, water impermeable material in the form of a thin film made from silicon, polyethylene, or similar materials. Alternatively, the shell may be a rigid frame with a plurality of thin film panels. Further, the shell may be a casing with a plurality of air holes covered by a silicon membrane.

The cell stack includes a plurality of metal-air cells and one or more air plenums. The air plenums may have a substantial U-shaped air pathway or a barricade with a plurality of gaps therein to permit air mixing. The isolating passageways may include a plurality of passageways, including an air inlet and an air outlet. The isolating passageways may have a first dimension in the direction parallel to the flow of air into the cell stack and a second dimension in a direction perpendicular to the flow of air into the cell stack. The first dimension is greater than said second dimension and may be more than twice as large as the second dimension. The air plenums also may include an open area between a pair of metal-air cells.

In another embodiment, the improved metal-air battery has a substantially uniform shell made from a thin film silicon material. The metal-air cell stack with the isolating passageway is positioned within the shell. Likewise, the air mover is positioned adjacent to the cell stack and within the shell. Alternatively, the shell may be a rigid frame with a plurality of film panels or a casing with a silicon membrane thereon. The casing includes a plurality of air holes.

In another embodiment, the improved metal-air battery has a substantially uniform shell with a metal-air cell stack positioned therein. The metal-air cell stack has an isolating passageway with a first dimension in the direction parallel to the flow of air into the cell stack and a second dimension in a direction perpendicular to the flow of air. The first dimension is greater than the second dimension.

Other objects, features, and advantages of the present invention will become apparent upon review of the following detailed description of the preferred embodiments of the invention, when taken in conjunction with the drawings and the appended claims.

BRIEF DESCRIPTION OF THE DRAWINGS

FIG. 1 shows one embodiment of the metal-air battery using diffusion passageways described in commonly owned U.S. Pat. No. 5,691,074.

FIG. 2 is a perspective view of the metal-air battery of the present invention with an uniform rectangular outer shell.

FIG. 2A is a perspective view of the metal-air battery of the present invention with an uniform cylindrical outer shell.

FIG. 3 is a cross-sectional view of the metal-air battery of the present invention.

FIG. 3A is a partial cross-sectional view of the film showing the membrane layer and the support layer.

FIG. 4 is a plan view of the cell stack of the present invention.

FIG. 5 is cross-sectional view of the air plenum of the present invention.

FIG. 6 is perspective view of an isolating passageway of the present invention.

FIG. 7 is a cross-sectional view of an alternative air plenum.

FIG. 8 is a perspective view of the metal-air battery of the present invention with an alternative outer shell.

FIG. 9 is an exploded view of the metal-air battery of the present invention with an alternative outer shell.

FIG. 10 is a respective view of the metal-air battery of the present invention with an alternative air plenum design.

FIG. 11 is a cross-sectional view of the air plenum of the present invention.

DETAILED DESCRIPTION OF THE INVENTION

Referring now in more detail to the drawings, in which like numerals refer to like elements through out the several views, FIGS. 2–4 show an improved metal-air battery 100 of the present invention. The metal-air battery 100 includes a metal-air cell stack 110 and an air mover 120. The air mover 120 may be a conventional fan, a bellows, or a similar type of device. In this embodiment, a standard fan with a capacity of about twenty-eight (28) cubic feet/minute may be used.

The metal-air cell stack 110 and the air mover 120 are enclosed within a substantially uniform shell 130. The shell 130 may take any conventional shape. The rectangle shape shown in FIG. 2 is for purposes of example only. By way of further example, FIG. 2A shows a cylindrical shape. The only requirement of the shell 130 is that it substantially encloses the metal-air cell stack 110. The shell 130 may be penetrated for the positive electrical contact 140 and the negative electrical contact 150.

The shell 130 is preferably made from an air permeable, water impermeable thin film 135. The film 135 may be a laminated silicone, a silicone rubber, or a similar type of material using silicone as a membrane layer 137 and having a porous support layer 138. The support layer 138 may be a polyethylene-based material, such as the material available under the trademark Porex from the Porex Corporation of Fairburn, Ga. Such a material includes an network of open-celled omnidirectional pores. Other suitable support layers 138 may be made from High-Density Polyethylene (HDPE); Ultra-High Molecular Weight Polyethylene (UHMW); Polypropylene (PP); Polyvinylidene Fluoride (PVDF); Polytetrafluoroethylene (PTFE); Nylon 6 (N6); Polyethersulfone (PES); or Ethyl Vinyl Acetate (EVA). The support layer 138 is approximately thirty percent (30%) thicker than the membrane layer 137.

The film 135 should be substantially thin enough to allow a sufficient oxygen diffusion therethrough to support the electrochemical reaction within the cell stack 110. The film 135 also should be substantially water impermeable so as to prevent water from penetrating therethrough and to prevent electrolyte from possibly escaping from the cell stack 110 and coming in contact with the exterior of the battery 100. For example, if a silicone rubber film 135 is used, the film 135 may be about 0.5 mils to 5 mils in thickness. Depending upon the surface area of the shell 130 and the drain rate of the battery 100, such a film 135 may permit about 1,000 to 10,000 cubic centimeters per day of oxygen to diffuse therethrough when a load is placed on the battery 100.

The cell stack 110 is positioned within the shell 130. The cell stack 110 and the air mover 120 may be mounted to the shell 130 by struts 160 or similar structures. In the embodiment shown in FIGS. 3 and 4, six (6) metal-air cells 170 are positioned within the cell stack 110. Any conventional type of metal-air cell 170 with one or more air electrodes, one or more metallic electrodes, and an electrolyte may be used. The metal-air cells 170 may be arranged in three (3) pairs, an upper pair 180, a middle pair 190, and a lower pair 200. Positioned between the upper pair 180 and the middle pair 190 is an upper separator layer 210. Positioned between the middle pair 190 and the lower pair 200 is a lower separator layer 220. The separator layers 210, 220 may be made from a substantially rigid, non-air permeable material or simply may be a plurality of protrusions on the outer casing of the metal-air cells 170.

Positioned within each pair of metal-air cells 180, 190, 200 is an air plenum 230. The air plenum 230 provides reactant air to the respective metal-air cells 170 via one (1) or more isolating passageways 235. FIG. 5 shows a simplified air plenum 230 design. Air enters the air plenum 230 via an air inlet 240, passes around a barrier 250, and then exits via an air outlet 260. The passageways 235 herein (the air inlet 240 and the air outlet 260) are essentially rectangular in shape and may more properly be defined as a "gap" in the wall of the cell stack 110. The passageways 235 and the air mover 120 are positioned such that ambient air flows through the air inlet 240 toward the oxygen electrodes of the cells 170 while oxygen depleted air flows away from the oxygen electrodes through the air outlet 260. Further, a first group of passageways 235 may function together as inlets and a second group of passageways 235 may function together as outlets.

Although one (1) air inlet 240 and one (1) air outlet 260 are shown herein, it is understood that a single passageway 235 could be used with a reciprocating air mover 120. In an alternating fashion, ambient air flows through the passageway 235 toward the oxygen electrodes and then air that is at least partially depleted of oxygen flows through the passageway 235 away from the oxygen electrodes. Further, multiple passageways 235 can be utilized in the aggregate such that the passageways 235 function in unison as inlets, and thereafter function in unison as outlets, in an alternating fashion. When air is provided to the oxygen electrodes by a reciprocating airflow through one or more passageways 235, it is preferable for the air mover 120 to cause at least some mixing of air proximate to the oxygen electrodes. This mixing ensures that the electrodes are exposed to a relatively uniform distribution of oxygen.

The isolating passageways 235 herein are sized (i) to pass sufficient airflow therethrough when the air mover 120 is operative so that the metal-air cells 170 provide an output current for powering a load and (ii) to restrict airflow and diffusion therethrough while the passageways 235 are unsealed and the air mover 120 is not operative so that the oxygen electrodes are at least partially isolated from the ambient air. The isolating passageways 235 maintain a constant humidity level such that the internal water vapor protects the oxygen electrodes of the cell. Each isolating passageway 235 provides an isolation function while at least partially defining an open communication path between the ambient air and the oxygen electrodes. The isolating passageways 235 therefore provide an isolation function without requiring a traditional air door or doors, or the like, to seal the isolating passageways 235. These isolating passageways 235 preserve the efficiency, power and lifetime of the metal-air cells 170.

Although the isolating passageways 235 substantially restrict air flow and diffusion while the air mover 120 is not operative, it is desirable in some systems to permit a limited amount of diffusion through the isolating passageways 235. For example, the isolating passageways may allow diffusion of oxygen away from the oxygen electrodes to the ambient environment in secondary or rechargeable metal-air cells. As another example, at least a limited amount of oxygen may diffuse from the ambient air through the isolating passageways 235 to the oxygen electrodes. This limited diffusion maintains a consistent "open cell voltage" so as to minimize any delay that may occur when the metal-air cells 170 transition from a low or no current demand state to a maximum output current state.

The isolating passageways 235 are preferably constructed and arranged to allow a sufficient amount of airflow therethrough while the air mover is operating so that a sufficient output current, typically at least fifty (50) ma, and preferably at least 130 ma, can be obtained from the metal-air cells 170. In addition, the isolating passageways 235 are preferably constructed to limit the airflow and diffusion therethrough such that the leakage or drain current while the air mover 120 is not operative is smaller than the output current by a factor of about fifty (50) or greater. In addition, the isolating passageways 235 are preferably constructed to provide an "isolation ratio" of more than fifty (50) to one (1), as described above.

More specifically, each of the isolating passageways 235 preferably has a width 262 and a height 263 that is generally perpendicular to the direction of flow therethrough, and a length 264 that is generally parallel to the direction of flow therethrough. These dimensions are selected to eliminate substantially airflow and diffusion through the isolating passageways 235 while the air mover 120 is not forcing airflow therethrough. The length 264 preferably is greater than the width 262 and the height 263, and more preferably the length 264 is greater than about twice the width 262 and the height 263. The use of larger ratios is preferred. Depending upon the nature of the metal-air cells 170 and the design of the passageways 235, the ratio can be more than about ten (10) to one (1). The preferred dimensions for a particular application will be related to the geometry of the passageways and the plenums, the particular air mover utilized, and the volume of air needed to operate the cells at a desired level In the example of FIGS. 3–6, each metal-air cell 170 may have a length of approximately 3.2 inches, a width of approximately 1.6 inches, and a height of approximately 0.25 inches. Likewise, each of the three (3) air plenums 230 also will have a length of about 3.2 inches and a width of about 3.2 inches. The height of the air plenums 230 may be about 0.04 inches. The isolating passageways 235 each may have a length 264 of about 0.2 inches, a height 263 of about 0.04 inches, and a width 262 of about 0.1 inches. In the rectangular construction of the present embodiment, the ratio of length 264 to width 262 and height 263 is therefore about two (2) to one (1).

The isolating passageways 235 are not necessarily rectangular, as any cross-sectional shape that provides the desired isolation is suitable. For example, the isolating passageways 235 may be tubular in shape, in this case having a diameter of about 0.04 inches and a length of about 0.2 inches. The isolating passageways 235 also need not be uniform along their length, so long as at least a portion thereof is operative to provided the desired isolation. Further, the isolating passageways 235 may be straight or curved along the length 264. In fact, an isolating passageway 235 need only force the air and the water vapor to follow a sufficiently restricted path when passing from the ambient air to the air electrode. Other exemplary isolating passageways and systems are disclosed in U.S. Pat. No. 5,691,074 and U.S. application Ser. No. 08/556,613, the entire disclosure of each of those documents is incorporated herein by reference.

The preferred capacity of the isolating passageways 235 for passing airflow in response to the operation of the air mover 120 depends upon the desired capacity of the metal-air cells 170. Any number of isolating passageways 235 can be used such that the aggregate airflow capacity of the multiple passageways equals a preferred total airflow capacity. Those skilled in the art will appreciate that the length 234 of the isolating passageways 235 may be increased, and/or the cross-sectional area decreased, if the differential pressure created by the air mover 120 is increased. A balance between the differential pressure created by the air mover 120 and the dimensions of the isolating passageways 235 can be found at which the airflow and the diffusion through the isolating passageways 235 will be sufficiently reduced when the air mover 120 is not forcing air therethrough. This invention thus results in a battery 100 with an adequate isolation ratio that can also operate in any orientation without concern that the air passageways 235 may be blocked or covered. Rather, air can penetrate the shell 130 from any direction.

FIG. 7 shows an alternative air plenum design. In this case the air plenum 270 has a barricade 280 with a series of gaps 290 therein. The gaps 290 allow air to pass therethrough and also promote the mixing of gasses therein. Any conventional interior air plenum design may be used with the cell stack 110 of the present invention.

FIG. 8 shows an alternative embodiment of the present invention. This figure shows a metal-air battery 300 with a modified shell 310. In this embodiment, the shell 310 includes a substantially rigid frame 320 and a plurality of film panels 330. The rigid frame 320 may be made from any substantially rigid, non-conductive polymer or similar materials. The film panels 330 are made from the same film 135 materials described above. The panels 330 are connected to the rigid frame via heat sealing, hot melt bonding, or by similar bonding means. The rigid frame 320 may take any conventional shape. The only requirement is that the panels 330 must be of sufficient size to allow adequate oxygen transport therethrough.

FIG. 9 shows a further embodiment of the present invention showing a modified shell 400. The modified shell 400 has a rigid case 410 with a plurality of air holes 420. The rigid case 410 may be made from any substantially rigid, non-conductive polymer or similar materials. The air holes 420 may be of any size or number so as to permit adequate airflow there through. The casing 410 and the air holes 420 are in turn covered with a silicone membrane 430 similar to the thin film 135 or the membrane layer 137 described above. The membrane 430 may be positioned on either side of the casing 410. The membrane 430 may be fixedly attached by conventional means or may be vacuum-formed on the casing 410.

FIGS. 10 and 11 show an alternative embodiment of the present invention. These figures show a modified cell stack 350 having a plurality of "open" air plenums 360. As compared to the air plenums 230, 270 described above, the open air plenums 360 shown herein have no side walls, air inlets, or air outlets. Rather, the open air plenums 360 simply have a plurality of support posts 370 or other support structures positioned between the metal-air cells 170. The height of the air plenums 360 (i.e., the direction perpendicular to the direction of the air flow), however, may be significantly reduced.

In this embodiment, the height of each air plenum 360 may be only approximately 0.01 inches. This very narrow or small height provides somewhat of an isolating function in that the air or the water vapor must travel through this narrow gap and across the air plenum 360. Although the isolating function may not be as effective on the periphery of the air plenum 360, the interior of the air plenum 360 is adequately protected from diffusion. A higher powered fan 120, however, may be necessary to provide an adequate air flow through and across the air plenum 360 given this narrow height.

From the foregoing description of the preferred embodiments and the several alternatives, other alternative constructions of the present invention may suggest themselves to those skilled in the art. Therefore, the scope of the present invention is to be limited only by the claims below and the equivalents thereof.

I claim:

1. An improved metal-air battery, comprising:
   a shell including a substantially oxygen-permeable, water-impermeable material; and
   a metal-air cell stack positioned within said shell;
   said metal-air cell stack comprising an isolating passageway,
   said metal-air cell stack remaining enclosed by said shell during passage of oxygen through said material for operation of said battery.

2. The metal-air battery of claim 1, further comprising an air mover positioned within said shell.

3. The metal-air battery of claim 2, wherein said air mover is positioned adjacent to said cell stack.

4. The metal-air battery of claim 1, wherein said shell comprises a thin film.

5. The metal-air battery of claim 1, wherein said shell comprises a rigid frame.

6. The metal-air battery of claim 1, wherein said shell comprises a plurality of film panels.

7. The metal-air battery of claim 1, wherein said shell comprises a casing.

8. The metal-air battery of claim 7, wherein said casing comprises a plurality of air holes.

9. The metal-air battery of claim 1, wherein said cell stack comprises a plurality of metal-air cells.

10. The metal-air battery of claim 1, wherein said cell stack comprises an air plenum.

11. The metal-air battery of claim 10, wherein said air plenum comprises a substantially U-shaped air path.

12. The metal-air battery of claim 10, wherein said air plenum comprises a barricade with a plurality of gaps therein.

13. The metal-air battery of claim 10, wherein said air plenum comprises a plurality of support posts.

14. The metal-air battery of claim 10, wherein said cell stack comprises a pair of metal-air cells and wherein said air plenum is positioned between said pair of metal-air cells.

15. The metal-air battery of claim 14, wherein said air plenum comprises an open area between said pair of metal-air cells.

16. The metal-air battery of claim 1, wherein said isolating passageway comprises a plurality of isolating passageways.

17. The metal-air battery of claim 1, wherein said isolating passageway comprises an air inlet and an air outlet.

18. The metal-air battery of claim 1, wherein said isolating passageway comprises a first dimension in the direction parallel to the flow of air into said cell stack and a second dimension in a direction perpendicular to the flow of air into said cell stack.

19. The metal-air battery of claim 18, wherein said first dimension is greater than said second dimension.

20. The metal-air battery of claim 19, wherein said first dimension is more than twice as large than said second dimension.

21. A metal-air battery, comprising:
    a shell including a substantially oxygen-permeable, water-impermeable material; and
    a metal-air cell stack positioned within said shell, said cell stack comprising an isolating passageway.

22. The metal-air battery of claim 21, wherein said shell comprises a silicon-based material.

23. The metal-air battery of claim 21, wherein said shell comprises a polyethylene-based material.

24. The metal-air battery of claim 21, wherein said shell comprises a silicon membrane.

25. An improved metal-air battery, comprising:
    a substantially uniform shell;
    said substantially uniform shell comprising a thin film silicon-based material;
    a metal-air cell stack positioned within said shell;
    said metal-air cell stack comprising an isolating passageway; and
    an air mover positioned adjacent to said cell stack and within said shell.

26. An improved metal-air battery, comprising:
    a substantially uniform shell;
    said substantially uniform shell comprising a casing with a silicon membrane thereon;
    a metal-air cell stack positioned within said shell;
    said metal-air cell stack comprising an isolating passageway; and
    an air mover positioned adjacent to said cell stack and within said shell.

27. The improved metal-air battery of claim 26, wherein said casing comprises a plurality of air holes.

28. An improved metal-air battery, comprising:
    a shell including a substantially oxygen-permeable, water-impermeable material; and
    a metal-air cell stack positioned within said shell;
    said metal-air cell stack comprising an isolating passageway,
    said metal-air cell stack remaining enclosed by said shell during passage of oxygen through said material for operation of said battery,
    said isolating passageway comprising a first dimension in the direction parallel to the flow of air into said cell stack and a second dimension in a direction perpendicular to the flow of air into said cell stack and wherein said first dimension is greater than said second dimension.

29. A metal-air battery, comprising:
    a shell including a substantially oxygen-permeable, water-impermeable material; and
    a metal-air cell stack positioned within said shell,
    said metal-air cell stack comprising an isolating passageway,
    permeation of oxygen through said material being the sole source of oxygen for operation of said battery.

30. The metal-air battery of claim 29, further comprising an air mover positioned adjacent said cell stack and within said shell.

* * * * *